(12) United States Patent
Berfanger et al.

(10) Patent No.: US 9,223,890 B2
(45) Date of Patent: Dec. 29, 2015

(54) SYSTEM AND METHOD OF PROCESSING CONTENT USING A UNIFORM RESOURCE IDENTIFIER

(75) Inventors: David M. Berfanger, Vancouver, WA (US); Matthew Ryan Bonner, Portland, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 271 days.

(21) Appl. No.: 13/048,611

(22) Filed: Mar. 15, 2011

(65) Prior Publication Data

US 2012/0239726 A1    Sep. 20, 2012

(51) Int. Cl.
*G06F 15/16* (2006.01)
*G06F 17/30* (2006.01)
*H04L 29/08* (2006.01)

(52) U.S. Cl.
CPC ...... *G06F 17/30893* (2013.01); *H04L 67/2823* (2013.01)

(58) Field of Classification Search
CPC ............................. H04L 67/28; H04L 67/2823
USPC ................................................. 709/203, 217
See application file for complete search history.

(56) References Cited

U.S. PATENT DOCUMENTS

| | | | |
|---|---|---|---|
| 5,699,460 A | 12/1997 | Kopet et al. | |
| 6,003,065 A | 12/1999 | Yan et al. | |
| 6,052,198 A | 4/2000 | Neuhard et al. | |
| 6,201,611 B1 | 3/2001 | Carter et al. | |
| 6,324,545 B1 | 11/2001 | Morag | |
| 6,529,214 B1 | 3/2003 | Chase et al. | |
| 6,636,891 B1 | 10/2003 | LeClair et al. | |
| 6,975,419 B2 | 12/2005 | Staas et al. | |
| 6,977,743 B2 | 12/2005 | Carlton | |
| 7,268,921 B2 | 9/2007 | Eguchi et al. | |
| 7,271,922 B2 | 9/2007 | Yamashita | |
| 7,283,272 B2 | 10/2007 | Johnson et al. | |
| 7,321,437 B2 | 1/2008 | Parry | |
| 7,366,758 B2 | 4/2008 | Kasatani | |
| 7,408,667 B2 | 8/2008 | Ferlitsch | |
| 7,409,434 B2 | 8/2008 | Lamming et al. | |
| 7,443,523 B2 | 10/2008 | Leone, III et al. | |
| 7,474,423 B2 | 1/2009 | Garcia et al. | |
| 7,538,899 B2 | 5/2009 | Kawaoka | |
| 7,599,083 B2 | 10/2009 | Reese et al. | |
| 7,634,541 B2 | 12/2009 | Chen et al. | |
| 7,663,674 B2 | 2/2010 | Billerbeck | |

(Continued)

OTHER PUBLICATIONS

R.T. Fielding, "Architectural Styles and the Design of Network-Based Software Architectures," Doctoral Dissertation, University of California, Irvine, 2000.

(Continued)

*Primary Examiner* — Jason Recek
(74) *Attorney, Agent, or Firm* — Trop Puner Hu, PC

(57) ABSTRACT

A host server receives a content request in the form of a Uniform Resource Identifier (URI) from a client. The URI identifies a first content resource and describes a first service resource to be applied to a representation of the first content resource. The URI is translated into an instruction set. The host server causes execution of the instruction set to apply the first service resource to a representation of the first content resource. A processed representation of the first content resource is then provided to the client in response to the request.

24 Claims, 4 Drawing Sheets

(56) References Cited

U.S. PATENT DOCUMENTS

| | | | |
|---|---|---|---|
| 7,711,832 | B1 | 5/2010 | Champion et al. |
| 7,779,108 | B2 | 8/2010 | Kawai |
| 7,783,706 | B1 | 8/2010 | Robinson |
| 7,800,775 | B2 | 9/2010 | Ono et al. |
| 7,924,452 | B2 | 4/2011 | Matsuda |
| 8,095,376 | B2 | 1/2012 | Gombert et al. |
| 8,248,647 | B2 | 8/2012 | Izaki |
| 8,610,921 | B2 | 12/2013 | Miyake |
| 8,624,989 | B2 | 1/2014 | Carpio et al. |
| 8,639,760 | B2 | 1/2014 | Konsella et al. |
| 2001/0019425 | A1 | 9/2001 | Yamashita |
| 2001/0040693 | A1 | 11/2001 | Saito et al. |
| 2002/0002590 | A1 | 1/2002 | King et al. |
| 2002/0191210 | A1 | 12/2002 | Staas et al. |
| 2002/0191211 | A1 | 12/2002 | Miller et al. |
| 2003/0067625 | A1 | 4/2003 | Kim |
| 2003/0163575 | A1* | 8/2003 | Perkins et al. ............... 709/229 |
| 2003/0225894 | A1 | 12/2003 | Ito |
| 2004/0114181 | A1 | 6/2004 | Kim |
| 2004/0137919 | A1 | 7/2004 | Biundo |
| 2004/0143651 | A1 | 7/2004 | Allen et al. |
| 2004/0167974 | A1 | 8/2004 | Bunn et al. |
| 2004/0196492 | A1 | 10/2004 | Johnson et al. |
| 2004/0227960 | A1 | 11/2004 | Farros et al. |
| 2005/0005003 | A1 | 1/2005 | Maekawa |
| 2005/0049837 | A1 | 3/2005 | Reese et al. |
| 2005/0132028 | A1 | 6/2005 | Lester et al. |
| 2005/0132094 | A1 | 6/2005 | Wu |
| 2005/0138137 | A1* | 6/2005 | Encarnacion et al. ........ 709/217 |
| 2005/0198572 | A1 | 9/2005 | Quiller et al. |
| 2005/0270569 | A1 | 12/2005 | Hayashi |
| 2007/0050447 | A1* | 3/2007 | Oikarinen .................... 709/203 |
| 2007/0050456 | A1 | 3/2007 | Vuong et al. |
| 2007/0213972 | A1* | 9/2007 | Schejter et al. ................. 704/9 |
| 2007/0271347 | A1 | 11/2007 | Logue et al. |
| 2008/0037062 | A1 | 2/2008 | Omino et al. |
| 2009/0002770 | A1 | 1/2009 | Cavill et al. |
| 2009/0086254 | A1 | 4/2009 | Duong |
| 2009/0089128 | A1* | 4/2009 | Tkatch et al. .................... 705/8 |
| 2009/0157859 | A1* | 6/2009 | Morris .......................... 709/223 |
| 2010/0328707 | A1 | 12/2010 | Miyake |
| 2011/0106729 | A1* | 5/2011 | Billingsley et al. ......... 705/36 R |
| 2011/0231782 | A1* | 9/2011 | Rohrabaugh et al. ......... 715/760 |
| 2012/0023162 | A1* | 1/2012 | Ott et al. ....................... 709/203 |
| 2012/0084365 | A1 | 4/2012 | McCann, Jr. |
| 2012/0250074 | A1 | 10/2012 | Kamppari et al. |
| 2012/0250076 | A1 | 10/2012 | Kumar et al. |
| 2012/0297026 | A1 | 11/2012 | Polis et al. |
| 2013/0063774 | A1 | 3/2013 | Nuggehalli et al. |
| 2013/0083045 | A1 | 4/2013 | Berfanger |
| 2013/0308165 | A1 | 11/2013 | Venkatesh et al. |
| 2013/0321860 | A1 | 12/2013 | Koshigaya |
| 2014/0022585 | A1 | 1/2014 | Cogan |

OTHER PUBLICATIONS

T. Hemalatha, G. Athisha, S. Jeyanthi, "Dynamic Web Service Based Image Processing System," 16th International Conference on Advanced Computing and Communications, ADCOM 2008.

Y. Liang, Y. Xiao, J. Huang, "An Efficient Image Processing Method Based on Web Services for Mobile Devices," 2nd International Congress on Image and Signal Processing, IEEE 2009.

T. Berners-Lee, R. Fielding, L. Masinter, "Uniform Resource Identifier (URI): Generic Syntax," RFC3986, Internet Engineering Task Force, 2005.

R. Fielding, J. Gettys, J. Mogul, H. Frystyk, L. Masiniter, P. Leach, T. Berners-Lee, "Hypertext Transfer Protocol—HTTP/1.1", RFC2616, Internet Engineering Task Force, 1999.

J. Postel, J. Reynolds, "File Transfer Protocol", RFC959, Internet Engineering Task Force, 1985.

M. Miri, H. Pooshfam, M. Rajeswari, D. Ramachandram, "A Web-Based Framework for Distributed Medical Image Processing Using Image Markup Language (IML)," 2009 Third UKSim European Symposium on Computer Modeling Simulation, IEEE 2009, pp. 470-475.

K. Keiser, R. Ramachandram, J. Rushing, H. Conover, S. Graves, "Distributed Services Technology for Earth Science Data Processing," Information Technology and Systems Center, University of Alabama in Huntsville.

S. Hastings, T. Kurc, S. Langella, U. Catalyurek, T. Pan, J. Saltz, "Image Processing for the Grid: A Toolkit for Building Grid-enabled Image Processing Applications," Proceedings of the 3rd IEEE/ACM International Symposium on Cluster Computering and the Grid, May 12-15, 2003.

Daniel Adams, "30 Brilliant Web-based Photo Editors," Jan. 23, 2009, <http://www.instantshift.com/2009/01/23/30-brilliant-web-based-photo-editors/> (23 pages).

Dave Weiner, "remotemagick: An XML-RPC web service API on top of the ImageMagick suite of tools," <http://web.archive.org/web/20100406234500/http://code.google.com/p/remotemagick/> Apr. 6, 2010 (1 page).

E. Gardner, New Business Models, Interview 2.0, "Peecho uses the cloud to turn your digital publication into print," Lean Back 2.0, May 17, 2012, pp. 1-5, The Economist Newspaper Limited 2013, Available at: <economistgroup.com/leanback/new-business-models/peecho-uses-the-cloud-to-turn-your-digital-publication-into-print/> (5 pages).

Erenkrantz et al., "CREST: A new model for Decentralized, Internet-Scale Applications," Sep. 2009, ISR Technical Report # UCI-ISR-09-4, <https://isr.uci.edu/sites/isr.uci.edu/files/techreports/UCI-ISR-09-4.pdf> (11 pages).

Fielding, et al., "Header Field Definitions," Mar. 1, 2011, RFC 2616, <http://web.archive.org/web/20110301103546/http://www.w3.org/Protocols/rfc2616/rfc2616-sec14.html> (30 pages).

Gijs Van Tulder, "PHP Frontend to ImageMagick.," Aug. 4, 2003, <http://www.devarticles.com/c/a/PHP/PHP-Frontend-to-ImageMagick/> (7 pages).

Google Cloud Print, 2013, Available at: <support.google.com/cloudprint/?hl=en> (10 pages).

Hewlett-Packard Co., "How to Enable HP Web Services and Configure HP ePrint," Mar. 18, 2011, <https://h30495.www3.hp.com/static/downloads/les/Mac_ePrint_configure_M4555.pdf> (1 page).

Hewlett-Packard Co., "HP ePrint," 2010, (Datasheet), <http://www.hp.com/hpinfo/newsroom/press_kits/2010/InnovationSummit/ePrint_Datasheet.pdf> (2 pages).

Hewlett-Packard Development Company, L.P., "App Developers Private Beta," Apr. 16, 2010, <http://web.archive.org/web/20100416210403/http://h30495.www3.hp.com/developers?> (5 pages).

Hewlett-Packard Development Company, L.P., "HP ePrintCenter," Aug. 14, 2010, <http://web.archive.org/web/20100814024025/http://h30495.www3.hp.com/about/eprint?> (14 pages).

James Clark et al., eds., "XML Path Language (XPath), Version 1.0," Nov. 1999, <http://www.w3.org/TR/xpath/> (32 pages).

Jason Hamilton, "Adding the Quick Print Button to Outlook 2010," Jan. 22, 2011, <https://www.404techsupport.com/2011/01/adding-the-quick-print-button-to-outlook-2010/> (4 pages).

John Fronckowiak, "Processing Images with Amazon Web Services," Sep. 21, 2008, <https://aws.amazon.com/items/1602?externalID=1602> (8 pages).

Klensin, J., "Simple Mail Transfer Protocol," Request for Comments: 5321, Network Working Group, Oct. 2008, <http://tools.ietf.org/html/rfc5321> (190 pages).

M. Sipser, "Pushdown Automata," Introduction to the Theory of Computation, 2 ed., 2006, Chap. 2, section 2.2, Thompson Course Technology (18 pages).

N. Alameh. "A Raster Image Re-Projection Web Service Prototype," Photo. Eng. Rem. Sens. 70(5), 635-642 (2004).

Nathan Moroney, "Local Color Correction Using Non-Linear Masking," 2000, Proceedings of IS&T/SID 8th Color Imaging Conference:Color Science and Engineering Systems, Technologies, Applications. pp. 108-111 (2000).

Resnick Ed., P., "Internet Message Format," Request for Comments: 5322, Network Working Group, Oct. 2008, <http://tools.ietf.org/html/rfc5322> (114 pages).

(56) References Cited

OTHER PUBLICATIONS

Richard Lai, "HP ePrint really works: eMails and attachments printed from the cloud (video)," Jul. 2, 2010, <http://www.engadget.com/2010/07/02/hp-eprint-really-works-emails-and-attachments-printed-from-the/> (4 pages).

Stein, R., "2 hidden ways to get more from your Gmail address," Official Gmail Blog, Mar. 5, 2008, <http://gmailblog.blogspot.com/2008/03/2-hidden-ways-to-get-more-from-your.html> (2 pages).

Wikipedia, "Internet Message Access Protocol," Dec. 29, 2010, <http://en.wikipedia.org/w/index.php?title=Internet_Message_Access_Protocol&oldid=404727437> (6 pages).

* cited by examiner

SYSTEM AND METHOD OF PROCESSING CONTENT USING A UNIFORM RESOURCE IDENTIFIER

BACKGROUND

The invention relates to the field of electronic systems, and in particular to providing data processing web services (e.g. digital imaging web services) across a distributed, resource-oriented computing environment.

As used herein, a web service refers to a software service or system designed to support interoperable machine-to-machine interaction over a network (e.g., via HTTP (R. Fielding et. al., "Hypertext Transfer Protocol—HTTP/1.1", RFC2616 (Internet Engineering Task Force, 1999)), FTP (J. Postel and J. Reynolds, "File Transfer Protocol", RFC959 (Internet Engineering Task Force, 1985)), etc.). Web services capable of processing requests without the need for a server to persist information (or state) between requests from a client are considered to be "stateless" web services. REST (Representational State Transfer) and Computational REST (or CREST) are examples of stateless architectures for web services.

Data processing pipelines (e.g., digital imaging pipelines) are traditionally constructed from various component blocks. For example, in digital imaging pipelines, the component blocks might include image analysis, noise reduction, scaling, color adjustment, etc. These component blocks are typically deployed in rigid architectures that are tailored for specific applications and predefined tasks. These pipelines may optimize one or more goals, such as providing efficient processing, minimal memory consumption, etc. Software implementing these pipelines ranges from machine code for specialized hardware to procedural, modular, or object-oriented frameworks in more general-purpose languages.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
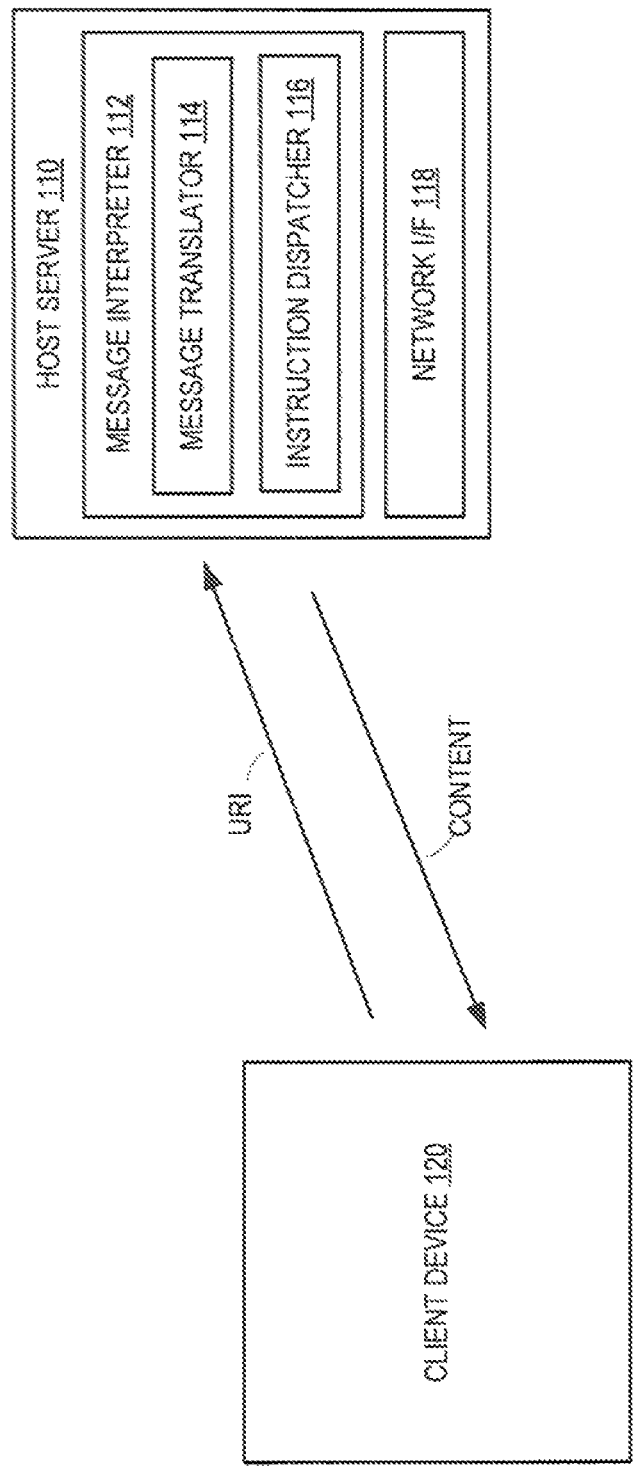
FIG. 1 is a block diagram illustrating a system according to various embodiments.

Data-oriented programs resulting from traditional data processing pipelines are robust and efficient; however, they are also self-contained and tied directly to physical computing layers such that constituent algorithms are highly interconnected and interdependent with software interfaces that vary between implementations. When extended to web-based solutions, the complexity of maintaining and synchronizing separate pipeline implementations for a growing number of applications and services becomes prohibitively burdensome.

XML-RPC (XML for remote procedure call), grid computing, and SOA (Service Oriented Architecture) are example approaches to interfacing with data pipelines for providing data processing (e.g., digital imaging) services. Such approaches may be used, for example, in providing several web-based photo editors for user-directed image processing. This type of service has a multi-stage execution model whereby a client accesses a stateless, persistent factory service that subsequently creates an instance of a transient, stateful session to manage client-server interactions. This can include a series of mutually dependent client requests regarding the open session directing the uploading of image data to the server, the manipulating of that data, and the downloading of the final processing results to the client.

Ad-hoc REST interfaces to traditional imaging pipelines may also be used. These services provide limited interfaces for purposing image content for particular applications (e.g., image resizing, cropping, etc.). While stateless methods of encapsulating a web service in REST avoid many of the disadvantages of stateful services, the limited interfaces associated with the stateless methods mentioned above make it difficult to implement multi-device conversation models, deferred processing, forwarded processing, custom pipeline construction, etc.

Accordingly, various embodiments described herein provide data processing pipelines as dedicated stateless web services that can be centrally maintained while also being generally available for a wide range of applications. While particular examples described herein focus on digital imaging, it should be noted that general embodiments are not so limited and may be applied in data processing environments other than digital imaging.

In various embodiments, server-side resources are made available as services to websites, cloud-based drivers (e.g., print drivers), mobile devices, and other suitable applications. In various examples, these services are concerned with processing available image content, including image uses and transformations. The services are specified with an API (Application Programming Interface) that allows both content and service resources to be combined to implement various complex operations (e.g., processing an image with two or more concatenated transformations, arranging various graphic elements and one or more images on a page, alpha compositing two of more images, stiching two of more images into panoramas, collages, or mosaics, etc.). While particular examples included herein describe the services being accessed statelessly using standard HTTP requests, it should be noted that general embodiments are not so limited and may involve other suitable protocols.

FIG. 1 is a block diagram illustrating a system according to various embodiments. FIG. 1 includes particular components, modules, etc. according to various embodiments. However, in different embodiments, more, fewer, or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Host server 110 is a server device that receives content requests from client device 120. For example, client device 120 might send a request for a transformed (e.g., resized, color corrected, cropped, etc.) version of an image. In various embodiments, content requests are sent to host server 110 as valid HTTP requests. All of the information necessary to produce the requested processed content is contained in the request. The request URI (T. Berners-Lee, R. Fielding, and L. Masinter, "Uniform Resource Identifiers (URI): Generic Syntax", RFC3986 (Internet Engineering Task Force, 2005)) identifies at least one content resource (e.g., an image) and describes at least one service resource (e.g., resizing, color correction, cropping, etc.) to be applied to the content resource(s).

Message interpreter 112 comprises message translator 114 and instruction dispatcher 116. In various embodiments, message translator 114 translates the request URI into an executable instruction set (e.g., direct function calls, pipes to external executable programs on host server 110, direct sockets to executable programs on other devices, requests to external web services, etc.) that applies the described service resources to the identified content resource(s). Instruction dispatcher 116 then causes execution of the instruction set. Instruction dispatcher 116 may execute all or part of the instruction set, including retrieving representation(s) of the content resource(s) from an external location (e.g., website) if the content resource(s) are not maintained locally. Upon execution of the instruction set, network interface 118 provides a processed representation of the content resource to client device 120.

In some embodiments, an HTTP request from client device 120 might include an entity enclosed in the request, allowing the client to provide a block of data to host server 110. The actual use of a request entity is determined by message interpreter 112 and is dependent on the request URI. For example, based on the request URI, message interpreter 112 might determine that the request entity is image data provided by client device 120 for processing by service resources identified by the request URI. Accordingly, message interpreter 112 might make available the identity of the request entity during one or both translation and execution of the instruction set. For another request URI, message interpreter 112 might determine that the request entity provides details regarding the capabilities of client device 120. Accordingly, message interpreter 112 might analyze the request entity in order to optimize response results according to the provided capabilities of client device 120. Other uses of the request entity are also possible.

Figure 2:
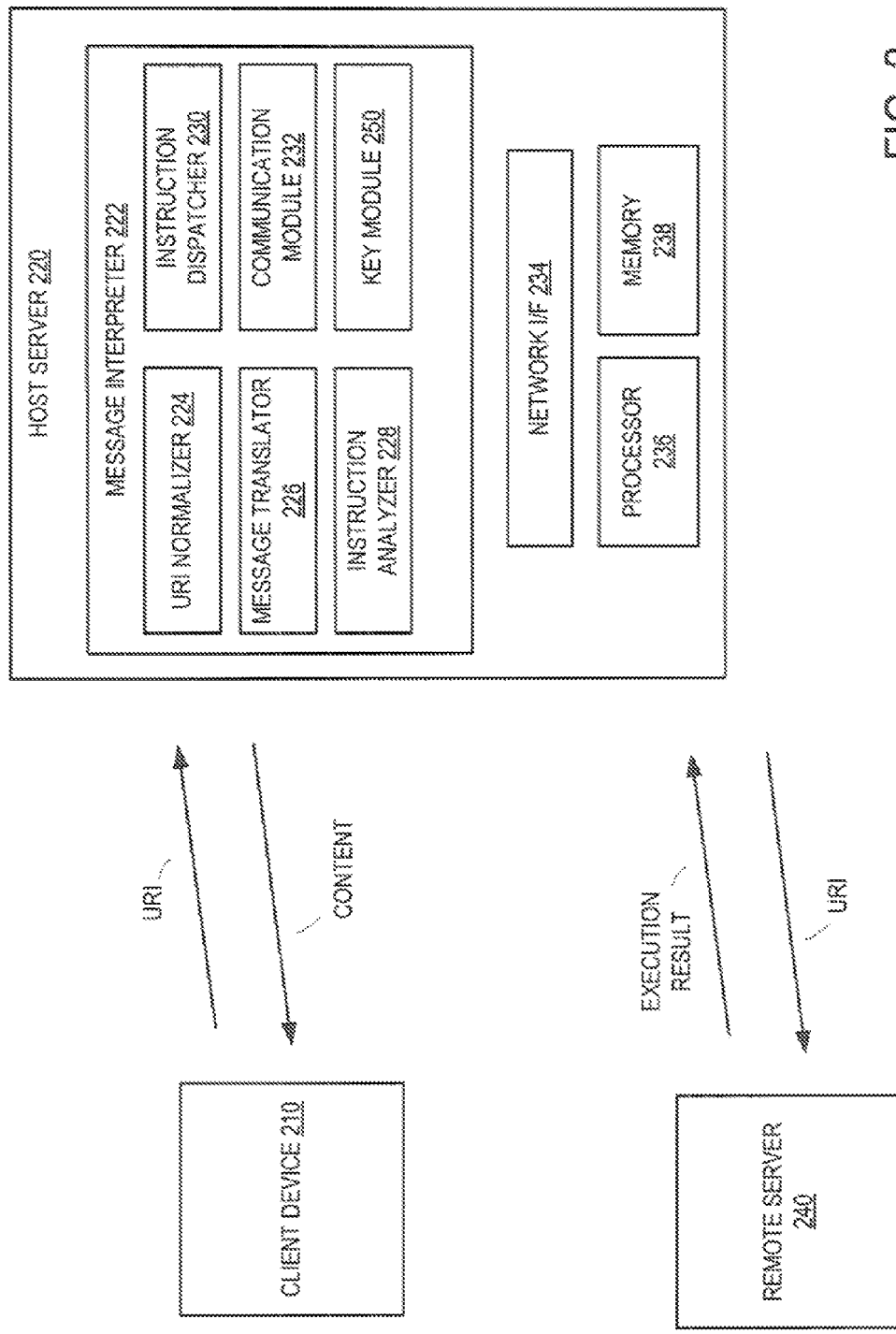
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Host server 220 is a server device that receives content requests from client device 210. For example, client device 210 might send a request for a transformed (e.g., resized, color corrected, cropped, etc.) version of an image. In various embodiments, content requests are sent to host server 220 as HTTP requests. All of the information necessary to produce the requested processed content is contained in the request. The request URI identifies at least one content resource (e.g., an image) and describes at least one service resource (e.g., resizing, color correction, cropping, etc.) to be applied to the content resource(s). Service resources are maintained on host server 220 (e.g., stored in memory 238 and executed by processor 236). Service resources may also be maintained, for example, on remote server 240.

Message interpreter 222 comprises URI normalizer 224, message translator 226, instruction analyzer 228, instruction dispatcher 230, communication module 232, and key module 250. URI normalizer 224 examines the request URI to produce a normalized request URI. URI normalization is accomplished by rewriting the request URI (e.g., to produce a standardized form to facilitate the generation of keys for caching intermediate and final processing results) based on properties on one or both of the identified content resource(s) and the described service resource(s). Key module 250 determines a unique key from the normalized URI to identify one or more stages of the execution pipeline. Normalizations may include, but are not limited to, re-ordering URI path segments, replacing URI path segments with preferred alternates that describe and/or identify the same or similar resources, etc. Message translator 226 then translates the normalized URI and any subordinate request entity (e.g., posted image data, resource catalog, macro, etc.) into an executable instruction set that applies the described service resource(s) to the identified content resource(s).

Instruction analyzer 228 analyzes the instruction set to determine which resources are needed to produce the requested processed content. Then, instruction analyzer 228 generates an execution pipeline for the resources. For example, an instruction set might include obtaining an image along with performing a color correction transformation and an image resizing transformation. Based on the service resources needed to execute these instructions, instruction analyzer 228 generates an execution pipeline that directs the loading into memory 238 of image data from the content resource, executing instructions associated with the service resources that perform the color correction and resizing transformations, providing the transformed image data to network interface 234, and cleaning up memory 238. Instruction dispatcher 230 then causes the execution of the instruction set according to the execution pipeline generated by instruction analyzer 228.

While a content resource may be stored locally (e.g., in memory 238), the request may identify a location for retrieving a representation of the content (e.g., an image) from a network (e.g., via HTTP, FTP, etc.). If a service resource needed to process the request is maintained on host server 220, host server 220 is directed by the execution pipeline to execute instructions from the instruction set that are associated with that, service resource. If a needed service resource is not maintained on host server 220 or it is otherwise determined that a service resource should be applied remotely, communication module 232 is directed to generate and to send an HTTP request (e.g., to remote server 240 via network interface 234) for executing instructions associated with that service resource. In alternate embodiments, communication module 232 initiates a connection to remote server 240 via a direct socket or other suitable connection mechanism. In general, instructions can be distributed across any combination of host server 220, remote server 240 and/or additional remote servers based on resource availability, processing requirements, etc.

In various embodiments, instruction analyzer 228 may generate an execution pipeline that optimizes execution performance by directing, for example, instruction dispatcher 230 to retrieve prior cached results rather than causing the execution of instructions associated with corresponding resources. Conversely, the execution pipeline may direct instruction dispatcher 230 to cache one or both intermediate and final results to improve subsequent execution performance. The normalized request URI facilitates determining unique keys for caching the results of executing the instruction set both whole and in part. Other optimizations (e.g., for processing efficiency, quality, etc.) may include, but are not limited to, re-ordering the application of service resources, selecting different services to achieve the same or similar result, balancing instruction distribution, etc. For example, in the case of mobile clients, distribution of resources could be dynamically balanced for best performance in a particular network bandwidth. If a device currently has a slow connection, one distribution may be preferred. In faster network conditions, a different distribution may be preferred. Distribution of instructions may be accomplished by generating new HTTP requests on the fly that are sent to remote server(s) for translation and execution.

In various embodiments, the HTTP request received by host server 220 may include references to variables, referred to herein as variable resources. These variable resources can store constant values and/or references to resource representations of various types, and they can be used in specifying content resources and service resources along with corresponding named and unnamed API parameters, as well as API access instructions allowing, for example, a portion of a resource representation to be selected for providing a parameter value or for identifying one or more alternate content resources. Often a variable resource can be resolved before the initial execution pipeline is generated. Other times a variable resource is assigned a reference to the execution result of a service resource. In this case, the variable resource cannot be resolved until after execution of the instruction set has started. Resolving a variable resource during execution of the instruction set can cause the execution pipeline to be modified, in which case instruction dispatcher 230 causes the execution of the instruction set to continue according to the modified execution pipeline.

Further, the HTTP request received by host server 220 may additionally identify one or more macros, referred to herein as macro resources. In various embodiments, macro resource representations are XML (Extensible Markup Language) data, although other suitable representation types could also be used. Message interpreter 222 can often translate a macro resource when generating the instruction set. Subsequently, the instructions obtained by translating the macro resource are treated the same as any instructions obtained by translating the request URI. Macro resources are maintained on host server 220 (or alternatively on remote server 240). Macros can also be maintained on client 210 or generated by converting a request URI, for example, during resource balancing negotiations. In some embodiments, a macro may be produced as an execution result of a service resource. A subsequent service resource may then cause the execution pipeline to be modified to direct the execution of instructions generated by translating the macro into an instruction set separate from the first instruction set, in which case instruction dispatcher 230 causes the execution of both instruction sets to continue according to the modified execution pipeline.

In other embodiments, an XML representation of a macro resource may be returned to client device 210 as the response to the original content request, signaling to client device 210, for example, a request from host server 220 to defer to client device 210 requested processing that is unavailable server-side. Based on the response, client device 210, which may include a message interpreter similar to message interpreter 222, might determine that it can indeed process part of the instruction set. Accordingly, client device 210 might send to host server 220 for completion the content request together with only those service request(s) that host server 220 can process. Upon completion, the requested partially processed content is provided back to client device 210 for processing to be completed. Alternately, client device might send to host server 220 a full request, encoding in the request URL explicit instructions regarding how to request unavailable processing from alternate remote server(s) or web service(s).

In addition to the functions and operations described above, client device 210, host server 220, remote server 240, and other remote servers can make available respective lists of available resources (referred to herein as resource catalogs). Resource catalogs can be made available, for example, as message entities in both HTTP responses and requests. In this way, client device 210 can request a list of available resources from host server 220. Host server 220 can return its own resource catalogs and/or the resource catalogs of available remote partners (e.g., remote server 240). Client device 210 can similarly provide a catalog of client-side resources that it maintains and/or resource catalogs of available remote partners to host server 220. Also, host server 220 and remote server 240 can exchange resource catalogs as part of content delivery negotiations.

Various modules and/or components illustrated in FIG. 2 may be implemented as a computer-readable storage medium containing instructions executed by a processor (e.g., processor 236) and stored in a memory (e.g., memory 238).

Figure 3:
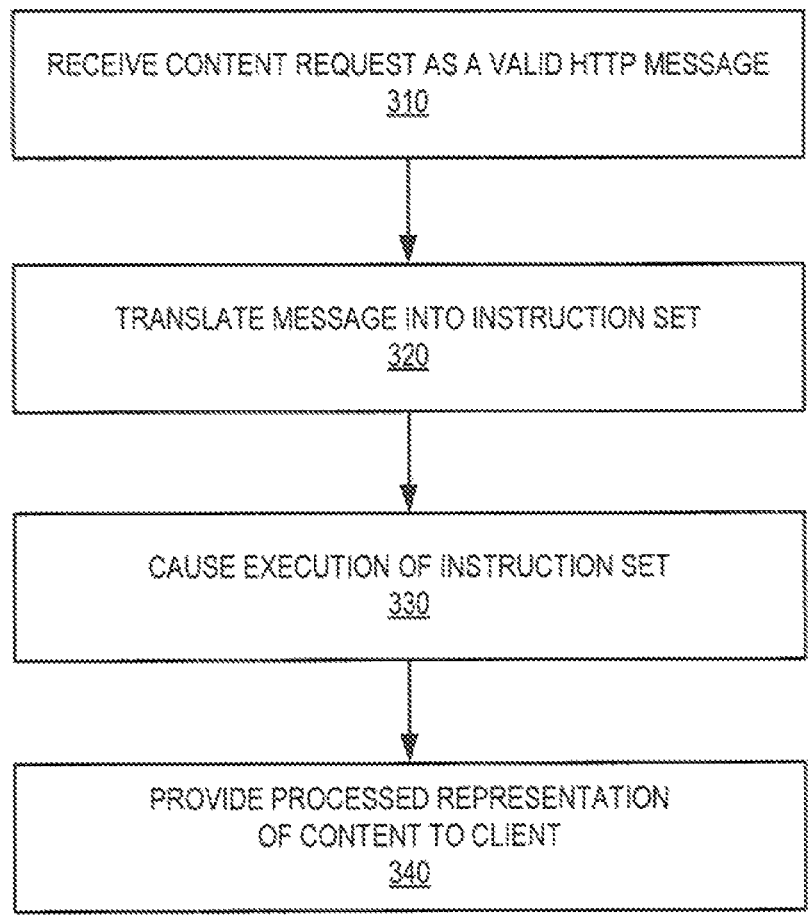
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A host server receives 310 a content request in the form of a valid HTTP request from a client. The request URI identifies one or more content resources (e.g., images) and describes one or more service resources (e.g., image manipulations, transformations, etc.) to be applied to one or more representations of the content resource(s). The path component of a URI consists of a sequence of segments separated by a slash (/) character. In various embodiments, URI paths are restricted to consist of a service context segment followed by path segments constrained to include only identifiers of content resources or else service resources, where each segment may also be divided into one or more subsegments (e.g., to provide parameter values) and where each subsegment may also include one or more modifiers (e.g., to provide access instructions for a content resource). URIs of content resources may be percent-encoded to prevent reserved characters used therein from conflicting with reserved characters used in the containing URI. Further, the URIs of API requests can be percent encoded to allow them to be included in another API request (e.g., providing a means of explicitly forwarding processing to other remote servers within a request to the host server).

In addition, multiple operators can be concatenated via slash (/) characters to produce an aggregate result. For example, appending "/grayscale/png" to a URI that identifies a JPEG image produces an aggregate result that converts the image to grayscale and converts the JPEG to PNG format. In other words, multiple additional instructions can be appended to a URI to further transform the content resource(s). The output of an aggregate processing result can be conceptualized as the execution of the service resources in terms of pushdown automata. Service resources pop content off an operand stack and then push their results back on. This conceptual framework helps to clarify how the API can direct various service resources to work together to produce complex results.

The host server translates 320 the path segments of the URI into an instruction set. In other words, the host server interprets the URI to determine the service context, the content resource(s), and the service resource(s) to be applied to the content resource(s). The host server then causes 330 execution of the instruction set. The host server may execute some or all of the instructions in the instruction set locally, or it may trigger execution of some or all of the instructions on one or more remote servers or defer processing to the client device or subsequent device. Results of instructions executed remotely are returned to the host server. In various embodiments, the host server provides 340 the final representation of the processed content (e.g., image) to the requesting client.

Figure 4:
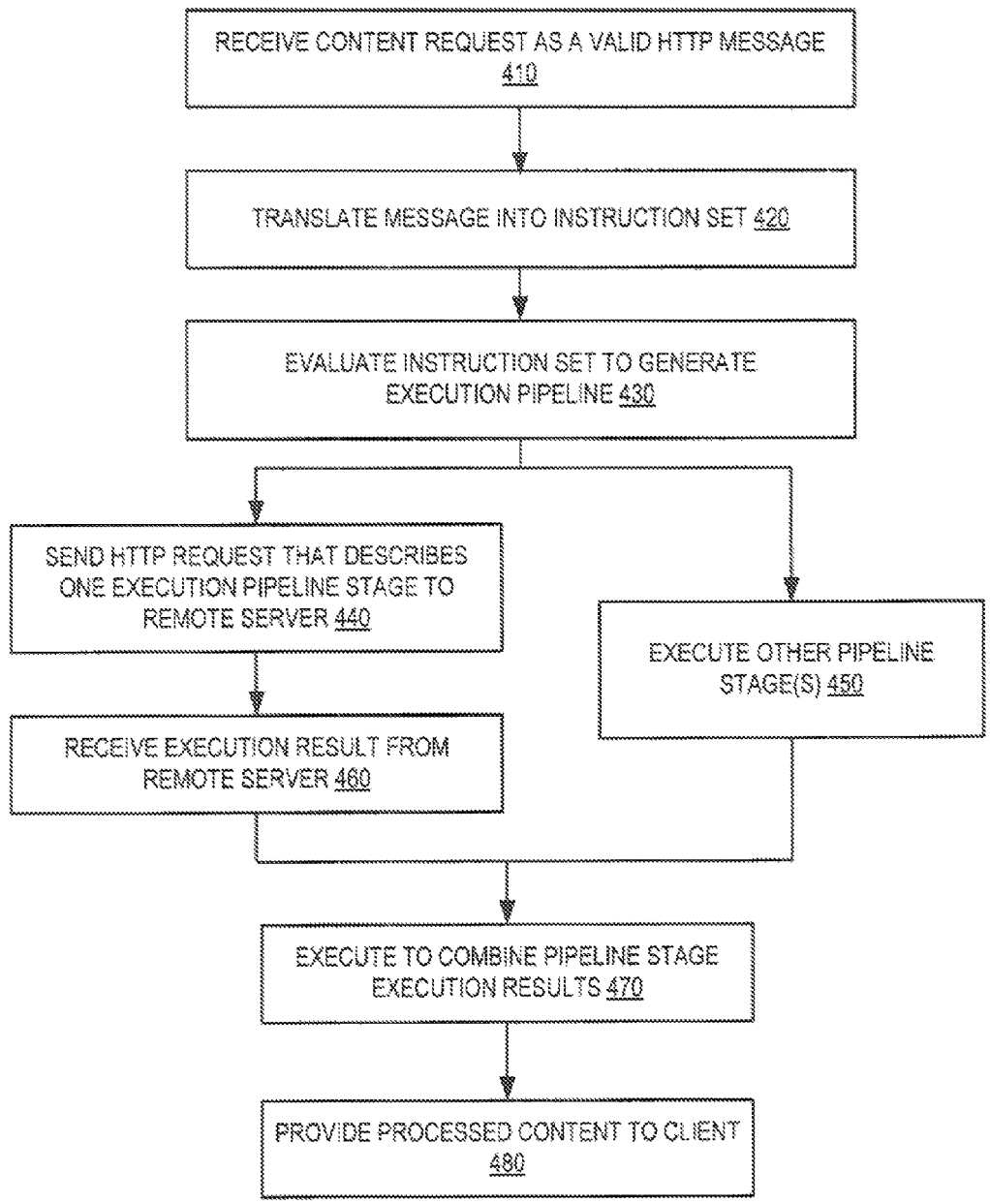
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A host server receives 410 a content request in the form of a valid HTTP request from a client. The request URI identifies one or more content resources (e.g., images) and describes one or more service resources (e.g., image manipulations, transformations, etc.) to be applied a representation of the content resource. The host server translates 420 the request URI and any subordinate request entity into an instruction set. In other words, the host server interprets the request to determine from the request message the content resource(s), service resource(s), variable resource(s), macro resource(s), etc. needed for fulfilling the request.

The host server evaluates 430 the instruction set to generate an execution pipeline for the resources. For example, the translated URI might set forth a particular order of operations. In evaluating the translated instruction set, the host server can determine that a different order of operations would optimize (e.g., increase processing efficiency, improve output quality, etc.) the processing results.

The instruction set may call for one or more stages of the execution pipeline to be processed remotely. Accordingly, the host server generates and sends 440 an HTTP request that describes the content and service resource(s) associated with the relevant pipeline stage(s) to a remote server similarly capable of translating and executing HTTP messages, as described herein. In other embodiments, the HTTP request for remote processing is encoded into the syntax of a non-related API for transmission to an independent, third party web service. The host server receives 460 an execution result from the remote server in response to sending the HTTP request. In addition, the host server executes 450 one or more stages of the execution pipeline.

The host server further executes 470 to combine pipeline execution stage results. For example, the host server may send an HTTP request to a remote server to have the remote server perform color correction on a representation of a specified image. Upon receiving the color corrected representation from the remote server, the host server may perform a resizing of the color corrected representation. The host server provides 480 the processed content (e.g., the aggregate image) to the client in response to the request.

In alternate embodiments, the host server can defer execution of pipeline stages to the requesting client. In other words, the host server can execute part of the instruction set generated from the URI content request and return the executed portion of the instruction set along with a response indicating the unexecuted portion of the instruction set to the client. Upon receiving the response, the client device can complete execution of the instruction set to generate the processed representation of the content resource or the client device can generate another URI request for a different server to complete execution of the instruction set and return the result.

In some embodiments, deferral of execution may be client-initiated. In such cases, the client might send a partial URI to the host server and complete processing upon receipt of the returned processed result from the host server. In other embodiments, deferral may be client-requested. The client may send a resource catalog, of available resources to the server, allowing the server to choose to defer processing to the client. In such cases, the server sends an XML file to the client describing which resources the server has chosen to defer. The client may then perform a client-initiated deferral.

In other embodiments, deferral may be server-initiated. When deferral is server-initiated, the server recognizes that a request service is unavailable. In such cases, the server sends back to the client a response (e.g., XML data) describing to the client which resources are unavailable. The client may then decide whether it can perform the unavailable processing itself or request it from yet another server. After making these decisions, the client can perform a client-initiated deferral to obtain the processed content. In yet other embodiments, deferral may be server-requested. In response to a service request, the server can send back a file (e.g., XML file) describing the service resources is has but that it prefers not to have to execute. The client can choose to respect this request, performing a client-initiated deferral, or else the client can choose to resend an amended request forcing the server to perform the processing.

Various modifications may be made to the disclosed embodiments and implementations of the invention without departing from their scope. Therefore, the illustrations and examples herein should be construed in an illustrative, and not a restrictive sense.

The invention claimed is:

1. A method, comprising:
receiving, by a first server from a client, a request for a transformed version of a first content resource, the received request comprising a Uniform Resource Identifier (URI) that identifies the first content resource and describes a first service resource and a second service resource, the first service resource to be applied to transform a representation of the first content resource in a first manner, and the second service resource to be applied to transform the representation of the first content resource in a second manner different from the first manner;
translating the request received from the client into an instruction set to be executed to transform the representation of the first content resource, the instruction set comprising an instruction corresponding to the first content resource and instructions corresponding to the first service resource and the second service resource;
transforming the representation of the first content resource by causing execution of the instruction set to apply the first service resource and the second service resource to the representation of the first content resource; and
providing the requested transformed version of the first content resource to the client in response to the request.

2. The method of claim 1, further comprising:
analyzing the instruction set to determine which service resources should be selected out of plural available service resources, at least two selected service resources being service resources needed to independently execute the respective instruction corresponding to the first service resource and the instruction corresponding to the second service resource;
based on the selected service resources, evaluating the instruction set to generate an execution pipeline,
wherein causing the execution of the instruction set is according to the execution pipeline.

3. The method of claim 2, wherein the URI further identifies a second content resource and wherein the method further comprises:
causing execution of the instruction set to apply at least one service resource to representations of the first and second content resources;
causing execution of the instruction set to combine processed representations of the first and second content resources; and
providing a combined representation of the processed representations to the client in response to the request.

4. The method of claim 2, wherein causing the execution of the instruction set comprises:
sending a secondary request that describes a stage of the execution pipeline to a remote server for execution;
receiving an execution result responsive to the secondary request from the remote server; and
executing at the first server a different stage of the execution pipeline incorporating the received execution result.

5. The method of claim 2, further comprising determining, from the URI, a unique key identifying a stage of the execution pipeline; and
using the unique key to cache an execution result on the first server.

6. The method of claim 2, wherein the request further describes a variable resource and wherein the method further comprises:
identifying a resource corresponding to the variable resource;
modifying the execution pipeline according to the identified resource,
wherein causing the execution of the instruction set is according to the modified execution pipeline.

7. The method of claim 2, wherein the request further describes a macro resource and wherein the method further comprises:
obtaining from the macro resource a description of an additional resource;
modifying the execution pipeline according to the additional resource,
wherein causing the execution of the instruction set is according to the modified execution pipeline.

8. The method of claim 1, wherein the first content resource identified in the URI includes an image to be transformed, and the first service resource and the second service resource are to be applied to transform a representation of the identified image.

9. The method of claim 1, wherein the translating comprises translating the URI into the instruction set.

10. The method of claim 1, further comprising:
analyzing, by the first server, the instruction set;
generating, by the first server, an execution pipeline responsive to the analyzing, the execution pipeline comprising the instructions corresponding to the first and second service resources, wherein causing the execution of the instruction set is according to the execution pipeline.

11. The method of claim 1, further comprising:
deferring, by the first server, execution of an unexecuted portion of the instruction set; and
sending, by the first server to the client, a response to the request, the response indicating the unexecuted portion of the instruction set.

12. The method of claim 1, wherein the URI comprises a path component including a sequence of segments, a first of the segments containing information for the first service resource, and a second of the segments containing information for the second service resource, and wherein the translating comprises translating the segments of the path component into the instruction set.

13. A server device comprising:
a processor; and
a message interpreter executable by the processor to receive, from a client, a request for a transformed version of a first content resource, the request comprising a Uniform Resource Identifier (URI) having a path segment that identifies the first content resource and separate path segments describing a first service resource and a second service resource, the first service resource to be applied to transform a representation of the first content resource in a first manner, and the second service resource to be applied to transform the representation of the first content resource in a second manner different from the first manner,
the message interpreter comprising:
a message translator to translate the request into an instruction set to be executed to transform the representation of the first content resource, the instruction set comprising a distinct instruction for each respective path segment in the URI;
an instruction dispatcher to cause execution of the instruction set to transform the representation of the first content resource, wherein the instructions for the path segments describing the first service resource and the second service resource are applied to the representation of the first content resource; and
a network interface to provide the transformed representation of the first content resource to the client in response to the request.

14. The server device of claim 13, further comprising:
an instruction analyzer executable by the processor to analyze the instruction set to determine which service resources are needed to produce a target transformation of the representation of the first content resource and to generate an execution pipeline based on the determined service resources prior to causing the execution of the instruction set; and
the instruction dispatcher to cause the execution of the instruction set according to the execution pipeline.

15. The server device of claim 14, wherein the URI includes a further path segment that identifies a second content resource and the server device further comprising:
the instruction dispatcher to cause the execution of the instruction set to apply at least one service resource to representations of the first and second content resources; and
the instruction dispatcher to cause the execution of the instruction set to combine processed representations of the first and second content resources; and
the network interface to provide a combined representation of the processed representations to the client in response to the request.

16. The server device of claim 14, wherein the message interpreter further comprises:

a communication module to send via the network interface a secondary request that describes a stage of the execution pipeline to a remote server for execution; and the communication module to receive via the network interface an execution result responsive to the secondary request from the remote server.

17. The server device of claim 14, wherein the message interpreter further comprises:

a URI normalizer to arrange the URI into a normalized form;

a key module to determine a unique key based on the normalized URI to identify a stage of the execution pipeline; and a memory to utilize the unique key to cache an execution result.

18. The server device of claim 14, wherein the request further describes a variable resource, and wherein the instruction analyzer is executable by the processor to:

identify a resource corresponding to the variable resource;

modify the execution pipeline according to the identified resource, wherein the causing of the execution of the instruction set is according to the modified execution pipeline.

19. The server device of claim 14, wherein the request further describes a macro resource, and wherein the instruction analyzer is executable by the processor to:

obtain from the macro resource a description of an additional resource;

modify the execution pipeline according to the additional resource, wherein the causing of the execution of the instruction set is according to the modified execution pipeline.

20. A non-transitory computer-readable storage medium storing instructions that, when executed, cause a first server to:

receive, from a client, a request for a transformed version of a first content resource, the request comprising a Uniform Resource Identifier (URI) that identifies the first content resource to be transformed and describes a first service resource and a second service resource, the first service resource to be applied to transform a representation of the first content resource in a first manner, and the second service resource to be applied to transform the representation of the first content resource in a second manner different from the first manner;

translate the request, including the URI, into an instruction set to be executed to transform the representation of the first content resource;

analyze the instruction set to determine which service resources are needed to transform the representation of the first content resource according to the request, at least two determined service resources being related to the first service resource and the second service resource;

cause execution of the instruction set to transform the representation of the first content resource; and provide the transformed representation of the first content resource to the client in response to the request.

21. The computer-readable storage medium of claim 20, storing further instructions that cause the first server to:

prior to causing the execution of the instruction set, generate an execution pipeline based on the determined service resources, wherein causing the execution of the instruction set is according to the execution pipeline.

22. The computer-readable storage medium of claim 16, wherein the URI further identifies a second content resource, and wherein the computer-readable storage medium stores further instructions that cause the first server to:

execute the instruction set according to the execution pipeline to combine processed representations of the first and second content resources; and communicate a combined representation of the processed representations to the client in response to the request.

23. The computer-readable storage medium of claim 21, storing further instructions that cause the first server to:

send via a network interface a secondary request that describes a stage of the execution pipeline to a remote server for execution; and receive via the network interface an execution result responsive to the secondary request from the remote server.

24. The computer-readable storage medium of claim 21, wherein the request further describes a variable resource or macro resource, and wherein the computer-readable storage medium stores further instructions that cause the first server to:

identify a resource corresponding to the variable resource or the macro resource;

modify the execution pipeline according to the identified resource, wherein causing the execution of the instruction set is according to the modified execution pipeline.

* * * * *

UNITED STATES PATENT AND TRADEMARK OFFICE
CERTIFICATE OF CORRECTION

PATENT NO.        : 9,223,890 B2
APPLICATION NO.   : 13/048611
DATED             : December 29, 2015
INVENTOR(S)       : David M. Berfanger et al.

It is certified that error appears in the above-identified patent and that said Letters Patent is hereby corrected as shown below:

On the Title Page, in item (74), Attorney, in column 2, line 1, delete "Puner" and insert -- Pruner --, therefor.

Specification

In column 12, line 18 approx., in Claim 22, delete "claim 16," and insert -- claim 21, --, therefor.

Signed and Sealed this
Nineteenth Day of April, 2016

Michelle K. Lee
*Director of the United States Patent and Trademark Office*